Patented May 15, 1945

2,376,224

UNITED STATES PATENT OFFICE 2,376,224

PURIFIED PENTAERYTHRITOL REACTION BY-PRODUCT

Isidor M. Bernstein and Herman J. Lanson, Brooklyn, N. Y., assignors to H. D. Roosen Company, Brooklyn, N. Y., a corporation of New York No Drawing. Application January 27, 1942, Serial No. 428,384

3 Claims. (Cl. 260—616)

This invention relates to a purified pentaerythritol reaction by-product suitable for use in the preparation of rapid drying oils by esterification with drying oil fatty acids and in the preparation of resins by esterification with rosin, resin acids or di-basic acids, and to a method of obtaining the same.

An object of the invention is to make pentaerythritol reaction by-products available for the above purpose.

Various other objects and advantages will be apparent as the nature of the invention is more fully disclosed.

In the manufacture of pentaerythritol various reaction by-products are obtained in the form of a crude residue containing various poly-ethers of pentaerythritol, other organic compounds and various metallic impurities. As an example, such a crude residue is marketed under the trade name Polypentek Crude by the Heyden Chemical Corporation. One of the poly-ethers, the di-ether, is readily recovered and purified. The other poly-ethers, however, are difficult to purify satisfactorily and the crude residue, as such, or when partially purified, cannot be used, for example, in the esterification of drying oil fatty acids to obtain quick drying oils because the esterification product is a gel or gel-like oil instead of the required limpid, free-flowing drying oil. Likewise, in the preparation of resins a similar gel tendency is exhibited when the esterification product is used as a vehicle component.

It is accordingly a further object of the present invention to provide a method for purifying the above mentioned crude residue so as to make the same available for use in the production of limpid, free flowing drying oils by esterification.

An analysis shows that the above mentioned crude residue contains copper, iron and aluminum as metallic contaminants. It was thought, therefore, that the objectionable gel-formation was due to the formation in situ of copper, iron and aluminum fatty acid soaps during the esterification process. However, we found that when the metallic contaminants were removed from the crude no substantial improvement was noted and the gel-formation was not materially reduced.

We found, however, that the crude residue contains as part of its hydroxyl or polyalcohol content, approximately 25% by weight of an organic compound which is readily soluble in ethyl alcohol. The acetyl value of this soluble portion of the crude residue was determined to be 790 as against 865 for the entire crude residue. It could not therefore be considered in the ordinary sense as a contaminant, although its solubility showed that it was not a poly-ether of pentaerythritol. Because of its high solubility, this fraction of the crude residue, we found, could be removed from the insoluble poly-ether portion by hot solvent extraction and filtration or continuous extraction. While ethyl alcohol can be used as a solvent for the "soluble organic fraction," water as well as other suitable organic solvents can also be used. However, when using ethyl alcohol or other suitable organic solvents, we found that the metallic contaminants, copper, iron, and aluminum present in the crude residue were not removed but remained in the insoluble portion. By varying the purification procedure we were able to remove, for the purpose of establishing the gellation cause, either the "organic soluble portion" or the metallic contaminants, and found that both were gellation factors differing only in degree.

We thus found that there are two causes for the gellation phenomena; the primary one being the "organic soluble fraction" of the crude residue, and the secondary one being the metallic contaminants. Therefore, in order to obtain the crude residue in a form sufficiently purified so that when esterified with drying oil fatty acids, limpid, free-flowing, non-gel, drying oil esters would result, it is necessary to remove both gellation causes. In accordance with the present invention this may be accomplished by the following process.

*Example*

A concentrated suspension of 1000 lbs. crude residue is boiled in a wooden tank in 600 gal. dilute aqueous hydrochloric acid containing 2% HCl (dry basis). This solubilizes both the "organic soluble fraction," and the metallic contaminants. 1200 gal. of water are then added to the tank, or sufficient amount, so that after settling of the insoluble fraction ⅔ or more of the clear supernatant liquor may be removed by syphoning. The insoluble fraction settles readily and within 24 to 48 hours syphoning may be carried out. Replacement wash water is added and the settling and syphoning off repeated. Two such washings are given. This washing procedure does not result in significant losses of the valuable poly-ethers themselves owing to their relative insolubility in water.

We do not, however, limit ourselves to this procedure of washing by decantation to remove the solubilized matter since other well known methods may be employed such as washing in a "wash type" filter press, where smaller quantities of wash water would suffice with resulting lower poly-ether losses.

After two washings by decantation or syphoning, the poly-ether sludge is neutralized from its residual hydrochloric acid by treatment with approximately 6 lbs. sodium carbonate or other alkali proportionally, and then filter pressed. The filterpress cake contains 1% or less of the gel forming substances, which we have found to be of sufficient purity for our purpose. The filter press cakes are then dried. The yield is 700 lbs.

The above described purification procedure is effective and can be carried out in an economical manner on a commercial scale. Other procedures which remove both the "organic soluble fraction" or a specific gel-forming portion thereof and the metallic contaminants may, however, be used.

For example, one alternate method is the continuous drip extraction of the crude residue by acidified water, alcohol or other suitable organic solvent. A dilute aqueous-alcohol solution of hydrochloric acid is particularly suitable for use with the continuous drip method. The essential feature resides in the removal of the specified undesirable gel-forming materials by treatment with an acidified solvent or combination of solvents. Such solvents may comprise the following: water, methyl alcohol, ethyl alcohol, n-propyl alcohol, iso-propyl alcohol, n-butyl alcohol, secondary butyl alcohol, tertiary butyl alcohol and the mono-alkyl ethers of ethylene glycol, propylene glycol, diethylene glycol etc., such as the methyl, ethyl, and butyl ethers, etc. although we prefer to use either water or ethyl alcohol or a mixture of the two. The solvent is acidified by mixing with hydrochloric acid or other strong inorganic acids, such as sulphuric, nitric, etc., or with relatively strong organic acids such as formic, acetic, or chloracetic acids, etc.

The residue when purified in the manner above described, produces on esterification with drying oil fatty acids such as those from linseed, perilla, dehydrated castor, tung, oiticica, soya bean etc., oils, limpid, free-flowing, non-gel drying oils of great usefulness. Similarly, synthetic resins made by esterification of the purified residue with rosin, resin acids, or dibasic acids or their anhydrides modified by drying oil fatty acids and/or resins and resin acids, are characterized by good solubility in drying oils and freedom of the solutions from gel, and possess properties of great usefulness in the coating industry.

Drying oil esters prepared from the purified residue according to our invention by esterification with drying oil fatty acids, may possess a somewhat dark color. This can be removed by treatment with decolorizing carbon and acid clay after esterification, or preferably by performing the esterification in the presence of the decolorizing carbon followed by the acid clay treatment after esterification at much lower temperatures. Drying oil esters so prepared are further characterized by very pale color in addition to their limpid, free-flowing, non-gel characteristics. They possess exceptionally fast air-dry properties when catalyzed with suitable proportions of metal driers. The dried films are tough, dry, free from surface tack in a few hours and do not exhibit "after tack" on ageing of the film. Further the air-dried or baked films possess excellent water resistance.

Examples of the use of the above mentioned purified residue in the esterification of drying oil fatty acids and of resins follow:

EXAMPLE 1.—*Pale non-gel fast drying oil and printing ink stand oil*

| | Parts |
|---|---|
| Linseed oil fatty acids | 900 |
| Purified residue | 158 |
| Decolorizing carbon | 19 |
| Mineral spirits | 115 |

Heat in reaction kettle, equipped with stirrer, $CO_2$ gas inlet, and condenser. Heating cycle approximately 6 hours at 485° F. until acid value falls to 7–10 and acetyl value 8–12. If it is desired to body the resulting oil to form a stand oil, then raise the temperature to 560° F. and hold approximately one hour at 560° F. depending on the body desired. In either case, let cool to 200° F. and add 36 parts acid clay, stir, and filter. With .05% cobalt as metal, this oil dries in 1½ hours to a tough, tack-free film, with no development of "after tack." The drying time is comparable to China-wood oil. Water resistance of the dried film is very good. The "stand oil" dries somewhat faster than the unbodied oil and with equally tack-free films.

EXAMPLE 2.—*Pale non-gel fast drying oil and printing ink stand oil*

| | Parts |
|---|---|
| Dehydrated castor oil fatty acids | 900 |
| Purified residue | 158 |
| Decolorizing carbon | 19 |
| Mineral spirits | 115 |

Heating cycle and procedure as in Example 1. With .05% cobalt as metal, this oil dries to a tough, tack-free film in one hour. No objectionable "after tack" develops as in the case of dehydrated castor oil. The drying time is less than for China-wood oil. The "stand-oil" dries somewhat faster than the unbodied oil. Water resistance is excellent.

EXAMPLE 3.—*Combination resin-oil fast drying vehicle*

| | Parts |
|---|---|
| Dehydrated castor oil fatty acids | 762 |
| Polymerized rosin or equivalent amount of rosin | 190 |
| Purified residue | 158 |
| Decolorizing carbon | 19 |
| Mineral spirits | 115 |

Heating cycle 4 hours at 485° F. and 6 hours at 525° F. Acid value 10–14. Can be used for tin printing ink baking vehicle. Possesses very fast drying property, good color and color retention and toughness.

EXAMPLE 4.—*Rosin ester*

| | Parts |
|---|---|
| Rosin (acid value 165) or equivalent, (depending on acid value) | 1062 |
| Purified residue | 158 |
| Mineral spirits | 115 |

Heat in reaction vessel as described for 8 hours at 525° F.

Although certain specific embodiments of the invention have been shown for purposes of illustration, it is to be understood that the invention is not to be restricted thereto, but is only to be limited in accordance with the scope of the following claims.

What is claimed is:

1. The method of removing gel forming components from the crude, solid poly-ethers of pentaerythritol obtained as a reaction by-product in the production of pentaerythritol, which comprises treating said crude with an acidified solvent to dissolve said gel forming components, and separating the solution containing said components from the residue containing the desired insoluble poly-ethers.

2. The method of removing gel forming components from the crude, solid poly-ethers of pentaerythritol obtained as a reaction by-product in the production of pentaerythritol, which comprises treating said crude with dilute aqueous hydrochloric acid to dissolve said gel forming components, and separating the solution containing said components from the residue containing the desired insoluble poly-ethers.

3. The method of removing gel forming components from the crude, solid poly-ethers of pentaerythritol obtained as a reaction by-product in the production of pentaerythritol, which comprises treating said crude with an acidified alcohol solution to dissolve said gel forming components, and separating the solution containing said components from the residue containing the desired insoluble poly-ethers.

ISIDOR M. BERNSTEIN.
HERMAN J. LANSON.